US011543895B2

(12) United States Patent
Ballagas et al.

(10) Patent No.: US 11,543,895 B2
(45) Date of Patent: Jan. 3, 2023

(54) BIOMETRICS FOR PREDICTIVE EXECUTION (71) Applicant: Hewlett-Packard Development Company, L.P., Spring, TX (US)

(72) Inventors: Rafael Antonio Ballagas, Palo Alto, CA (US); Hiroshi Horii, Palo Alto, CA (US); Mithra Vankipuram, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/414,973

(22) PCT Filed: Apr. 12, 2019

(86) PCT No.: PCT/US2019/027251
§ 371 (c)(1),
(2) Date: Jun. 17, 2021

(87) PCT Pub. No.: WO2020/209866
PCT Pub. Date: Oct. 15, 2020

(65) Prior Publication Data
US 2022/0057865 A1 Feb. 24, 2022

(51) Int. Cl.
*G06F 3/023* (2006.01)
*G06F 3/01* (2006.01)
(52) U.S. Cl.
CPC ............ *G06F 3/0237* (2013.01); *G06F 3/015* (2013.01)

(58) Field of Classification Search
CPC .............................. G06F 3/0237; G06F 3/015
See application file for complete search history.

(56) References Cited

U.S. PATENT DOCUMENTS

| | | | |
|---|---|---|---|
| 6,573,844 B1 | 6/2003 | Venolia et al. | |
| 6,654,733 B1 | 11/2003 | Goodman et al. | |
| 8,384,566 B2 | 2/2013 | Bocirnea | |
| 9,122,672 B2 | 9/2015 | Griffin et al. | |
| 9,910,588 B2 | 3/2018 | Pasquero et al. | |
| 2009/0327171 A1 | 12/2009 | Tan et al. | |
| 2011/0029862 A1 | 2/2011 | Scott et al. | |
| 2011/0099506 A1 | 4/2011 | Gargi et al. | |
| 2011/0260830 A1* | 10/2011 | Weising | A63F 13/40 340/5.52 |
| 2017/0124474 A1 | 5/2017 | Kashyap | |
| 2018/0024634 A1 | 1/2018 | Kaifosh et al. | |
| 2018/0074584 A1* | 3/2018 | Rüdiger | H04R 1/1016 |

FOREIGN PATENT DOCUMENTS

WO  WO-2010035574 A1  4/2010

* cited by examiner

*Primary Examiner* — Hang Lin
(74) *Attorney, Agent, or Firm* — Quarles & Brady LLP (57) ABSTRACT A method is described in which biometric input is associated with at least one selectable option on a user controller prior to receipt of a user selection for the at least one selectable option; a past input by a user of a previous selectable option on the user controller is identified; and the at least one selectable option is preemptively executed according to the biometric input and the past input of the previous selectable option, prior to receipt of the user selection for the at least one selectable option.

20 Claims, 7 Drawing Sheets

BIOMETRICS FOR PREDICTIVE EXECUTION

BACKGROUND

A controller is an input device utilized by a user. Controller devices allow users to interact with application programs by providing user input to those application programs in direct response to user input or interactions with the controller. The application program then responds to the user input.

DETAILED DESCRIPTION

In many situations, a hardware controller or user controller is utilized by a user to control a computer system by providing user input to an application program running on the computer system. Usually, the user performs an action, such as pressing a key, pressing a button, actuating a joystick, etc., in order to initiate user input. The user input is transmitted from the user controller to the computer system for execution according to the user input, and the result is rendered on a display screen coupled to the computer system.

The present disclosure presents techniques that use biometric sensing data to predict user input such as actuating a button on a user controller before the user actuates the button. This allows the system to preemptively execute a command based on a predicted button actuation (e.g., key press), before the button is physically pressed down or moved. Further, this preemptive execution can provide a performance increase in time sensitive tasks, such as online multiplayer games. Particularly, biometric sensors are used to capture biometric sensing data (e.g., electromyography (EMG) signals) of a user using the user controller, such as a game controller, keyboard, etc. A prediction engine/module can predict a user selection of a selectable button on the user controller based on the biometric signal(s) from the biometric sensors prior to the user actually selecting the button. Also, proximity sensors can be placed on the selectable buttons and/or near the selectable buttons to detect finger or hand position of the user relative to a particular selectable button, e.g., touching, hovering over, and/or approaching the selectable button. Based on the proximity data from the proximity sensors and the biometric data from the biometric sensors, a prediction engine (e.g., using machine learning, statistics, etc.) predicts that a selectable button will be selected and causes the selectable button to be selected prior to the selection being made by the user. The system can correct the predicted selection of the selectable button when the user's actual selection does not match the prediction (i.e., selects a different button).

Figure 1:
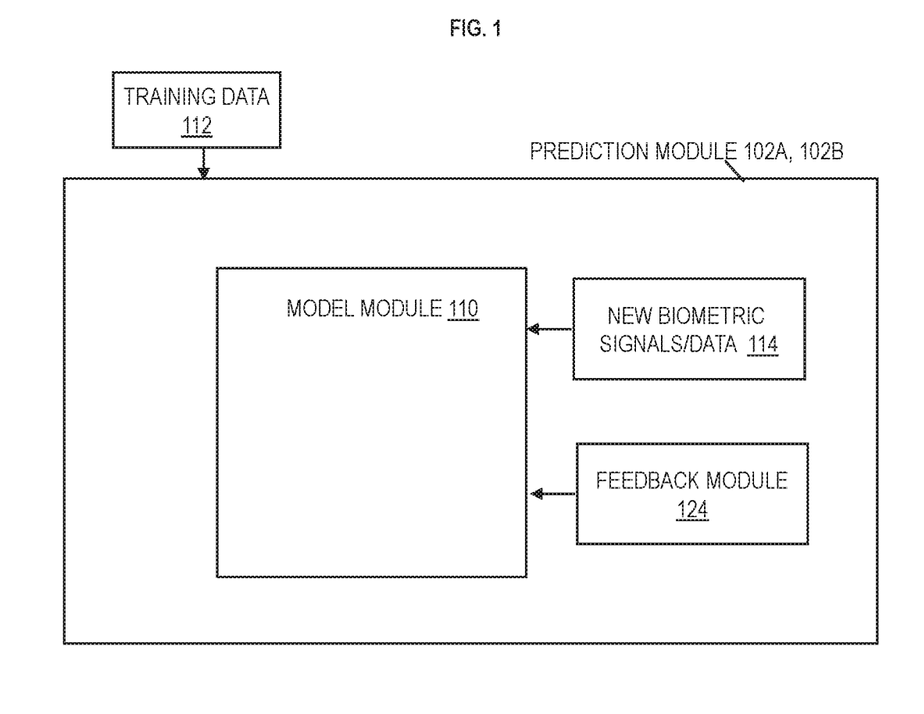
FIG. 1 depicts an example prediction module.

Turning now to the figures, FIG. 1 depicts an example of a prediction module 102A, 102B. The prediction modules 102A and 102B may be referred to as prediction module. The prediction module can predict user input by a user on a user controller before the user physically selects the selectable option on the user controller. The prediction module can include predictive models or model modules 110 which are designed to receive biometric sensing data and predict selectable options that the user will select in the future.

Model training of predictive model module 110 can begin by receiving training data, e.g., real-world training data 112. This training data 112 can comprise actual hardware user controller inputs from numerous users utilizing user controllers to select various selectable options along with their biometric sensing data corresponding to the users selecting the various selectable options on the user controllers. The user inputs can include sequences of user inputs, combinations of user inputs, and/or simultaneous user inputs for selections of selectable options made by the user along with corresponding biometric sensing data. Statistical, predictive, and/or machine learning based techniques can be utilized to train the predictive model module 110. The model module 110 can employ supervised learning, unsupervised learning, reinforcement learning, deep learning, and/or any other techniques. Examples of machine learning processes or techniques executed by the predictive model module 110 can include, but are not limited to, linear regression, logistic regression, linear discriminant analysis, classification and regression trees, naïve Bayes, K-nearest neighbors, learning vector quantization, support vector machines, bagging and random forest, boosting and Adaboost, etc. Other machine learning processes or techniques employed by the predictive model module 110 can include, but are not limited to, artificial neural networks (ANN), nonparametric Gaussian process (GP) regressor, etc.

In various implementations, biometric sensing data in the training data is labeled, e.g., classified or categorized, such that each piece of biometric sensing data is mapped (matches) to its actual user input executed on the user controller. There are numerous types of user controllers each with its own arrangement of selectable options. The predictive model module 110 can be trained on each type of user controller, although the type of user controller may be registered in advance such that the predictive model module 110 knows the corresponding types of biometric sensing data to expect for each type of user controller. During the training phase of the predictive model module 110, the training data can be labeled/classified in advance such that the model module 110 can learn the labels for each piece of biometric sensing data for its corresponding actual user input of selectable options on the user controllers. In some examples, the model module 110 can label the training data during the training phase, and the model module 110 can be corrected for any mislabeled pieces of biometric sensing data that do not correctly correspond to actual user input of selectable options on user controllers. Whether the biometric sensing data is labeled in advance and input to the model module 110 and/or if model module 110 labels the biometric sensing data and learns from corrections, the model module 110 learns how to correctly label the biometric sensing data to match the corresponding actual user input of selectable options on the user controllers, during the training phase. The model module 110 can be tuned to ensure that the biometric sensing data is properly labeled. As noted above, the predictive model module 110 can be trained on different types of user controllers having a prearrangement of selectable options and having their own biometric sensing data.

After training the model module 110, the trained predictive model module 110 of the prediction module 102A, 102B can receive new biometric sensing data 114. The trained predictive model module 110 programed in advance for different types of user controllers and the predefined arrangement of selectable options. The predictive model module can identify and match (e.g., label, classify, and/or categorize) each piece of biometric sensing data to a (predefined) label, class, and/or category.

The predefined model module 110 can use the matched biometric sensing data to determine/predict selectable options on a user controller corresponding to the labels, classes, and/or categories before receiving an actual response or selection of the selectable option from the user. The model module 110 may receive previous history of the previous selectable option (e.g., key press, joystick movement, etc.) on the user controller from a feedback module 124, and the location of the previous selectable option can be used as guide with biometric sensing data to the next selectable option. The feedback module 124 collects previous user input of previous selectable option(s) from the user controller. For example, the feedback module 124 can retrieve the most recent selectable option(s) selected (e.g., the previous key pressed) by the user on the user controller. The previous selectable option(s) can have a weight that reinforces the matched label and/or changes the matched label when a threshold is reached. The weighting can be based on an elapsed time from the previous selectable option(s) made by the user, where a shorter time interval has a greater weight than a longer time interval between the previously selectable option by the user on the user controller and the predicted selectable option. The predictive model module 110 is output the predicted selectable option(s) as predicted user input based on the biometric sensing data and the previously selected selectable option made by the used on the user controller, prior to the user selecting the selectable option(s) on the user controller.

Biometric sensor data can include signals that capture motor activation (e.g., using electromyography or EMG signals). The biometric sensors can be placed on different parts of the user's body to extract the EMG signals, which are then used to predict the user's selection of selectable option(s) prior to the user actually making a selection. The EMG signal is a biomedical signal that measures electrical currents generated in muscles during its contraction representing neuromuscular activities. EMG is sometimes referred to as myoelectric activity. Biometric sensors are used to collect the EMG signals, and biometric sensors comprise non-invasive electrodes which are used to acquire muscle signals. Muscle activation signals originate in the motor cortex of the brain. Other types of biometric sensors to detect brain activation in the motor cortex region, such as electroencephalogram (EEG), functional near-infrared spectroscopy (fNIRS), functional magnetic resonance imaging (fMRI), etc., can be used to predict user input. The system may combine brain activation and muscle activation sensors to improve the accuracy of the prediction.

Examples of user (hardware) controllers or user input devices that function with the prediction module 102A, 102B include, but are not limited to, gamepads, paddles, joysticks, trackballs, throttles, steering wheels, yokes, pedals, handheld controllers, mice or other pointing devices, gesture tracking devices, eye-tracking devices, body tracking devices, user held or worn inertial sensors and input devices, touchscreens, touch-sensitive surfaces, keyboards, video input devices, haptic input devices, etc., or any combination of such devices. For purposes of explanation and discussion, all of these types of controllers, whether wired or wireless, can be referred to herein as hardware controllers or user controllers.

Figure 2:
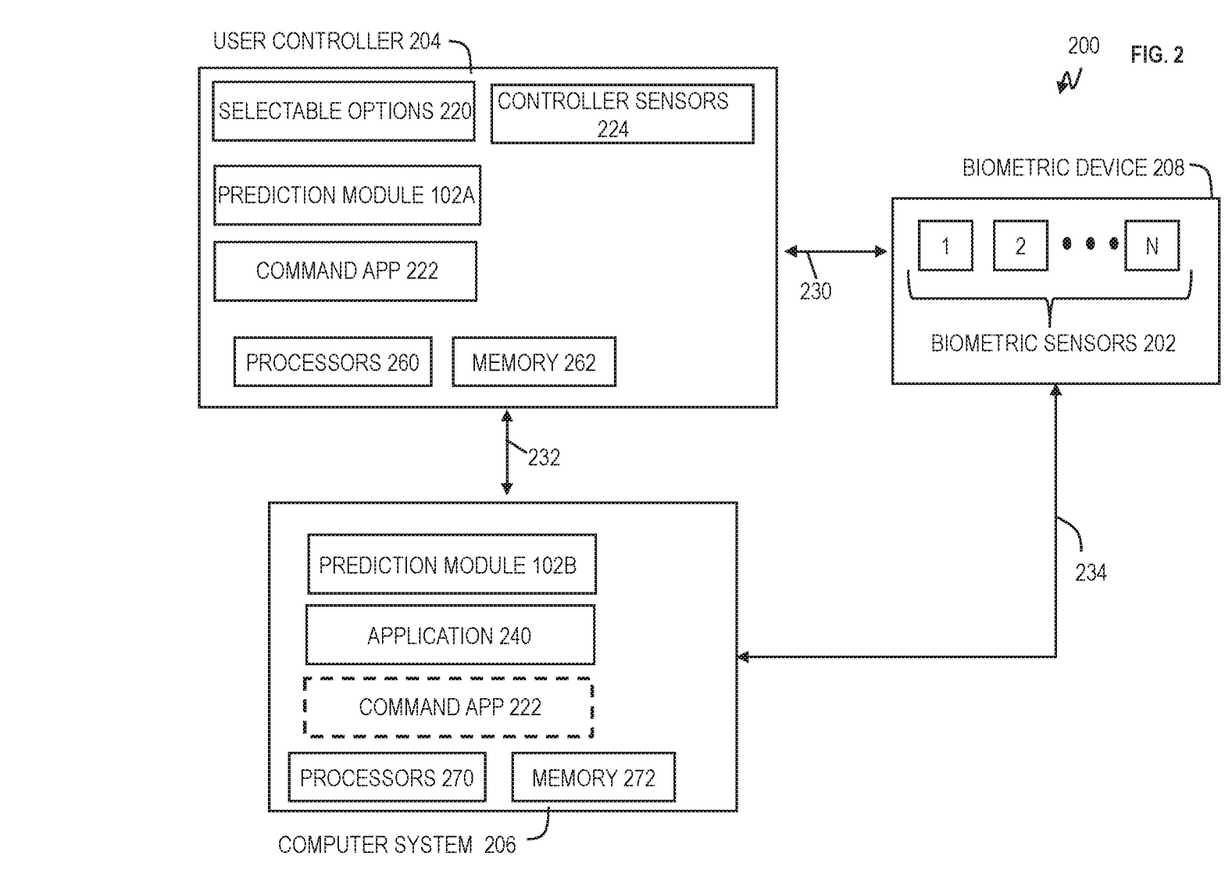
FIG. 2 depicts an example system for predicting user input to a user controller.

FIG. 2 depicts a system 200 for predicting user input to a user controller. The system 200 includes biometric sensors 202, which can be sensors 1-N, where N is the last number of sensors. The biometric sensors 202 can be coupled to user controller 204 to transmit biometric sensor data via connection 230 which can be a wireless or wired connection. In some examples, the biometric sensors 202 can be coupled to computer system 206 to transmit biometric sensor data via connection 234 which can be a wireless or wired connection. The biometric sensors 202 can be part of a biometric device 208. The biometric device 208 can include processors, memory, and computer-executable instructions. The computer-executable instructions are coupled to the memory 262 and function as discussed herein. The computer-executable instructions can operate on the processors to collect and transmit the biometric sensor data to the user controller 204 and/or the computer system 206. The biometric device 208 may include signal processing circuitry, such as filters, amplifiers, etc., to process the biometric sensing data (e.g., biometric signals) before transmission. The biometric device 208 can include transmitters and receivers for transmission of biometric sensor data and registration with the user controller 204 and/or computer system 206. In some implementations, the biometric device 208 can register with the user controller 204 and/or computer system 206 so that the prediction module 102A, 102B knows which target muscles and biometric sensors 202 to receive motor activation data (e.g., using EMG). In some implementations, this information is known in advance by the prediction module 102A, 102B based on the type of biometric device 208 being used to detect biometric sending data.

The biometric sensors 202 are designed such that the electrodes are mounted or positioned directly on the skin. There can be various implementations of biometric sensors used for different parts of the human anatomy in biometric devices 208. For example, biometric devices 208 can comprise biometric sensors placed on the wrist, forearms, hand, fingers, legs, feet, head, etc., and combinations thereof according to the muscles being targeted and according to the type of user controller 204 being used by the user. For any intended motor action, there occurs a time delay, which is known as the electromechanical delay (EMD), between the onset of the muscle activation (captured using, e.g., EMG) and exerting tension in the muscles (i.e., the actual movement). EMD has been reported to range from 10 milliseconds (ms) to about 150 ms, but varies differently depending on the intended tasks, and examples are not meant to be limited to such EMD. Additionally, examples can include EEG signals, fNIRS signals, fMRI signals, etc. Using the EMG, EEG, fNIRS, and/or fMRI signal(s) from biometric sensors 202 worn by the user, the prediction module 102A, 102B can predict user input by the user for selectable options on the user controller 204 before the user physically selects any of the selectable options on the user controller 204. The type of user controller 204 and/or type of biometric device 208 can be registered in advance with the prediction module 102A, 102B.

The user controller 204 includes processors 260, memory 262, and computer-executable instructions which execute on the processors 260. The computer-executable instructions are coupled to the memory 262 and function as discussed herein. The user controller 204 can include transmitters and receivers to transmit and receive data. The user controller 204 is an input device which is a piece of computer hardware equipment used to provide data and control signals (i.e., as commands) to an information processing system such as a computer or information appliance. The user controller 204 includes prediction module 102A which operates as discussed herein. The user controller 204 includes selectable options 220 which are selectable by the user of the user controller 204. The selectable options 220 can be pressed, pushed, pulled, rolled, toggled, rotated, etc., as a method of selection or engagement by the user. For example, a key on a keyboard can be pressed by the user to select that key, and the corresponding control signal (or command) is provided. The prediction module 102A can predict the targeted selectable options 220 and execute commands (or control signals which cause execution of commands) for targeted selectable options 220 prior to the user actually selecting any one of the selectable options 220, and the user controller 204 can transmit the predicted user input for targeted selectable options 220 to the computer system 206. For example, EMG signals can be used by the prediction module to identify the selectable options 220 being targeted by the user of user controller 204 before the user physically selects the targeted selectable options 220. Communication between the user controller 204 and computer system 206 is via connection 232 which can be a wired and/or wireless connection.

Examples of the user controller 204 include, but are not limited to, gamepads, paddles, joysticks, trackballs, throttles, steering wheels, yokes, pedals, handheld controllers, mice or other pointing devices, gesture tracking devices, eye-tracking devices, body tracking devices, user held or worn inertial sensors and input devices, touchscreens, touch-sensitive surfaces, keyboards, video input devices, haptic input devices, etc., or any combination of such devices. The user controller 204 can include controller sensors 224 which can be positioned on, near, and/or around the selectable options 220. The controller sensors 224 can detect movement on and near individual selectable options 220. In some implementations, an individual controller sensor 224 can be place on each individual selectable option 220. For example, the controller sensors 224 detect current finger position, such as touching a particular key/button, hovering over a key/button, approaching a key/button, etc., to more accurately predict the targeted selectable option 220. Accordingly, the prediction module 102A, 102B can receive proximity data or control sensor data from the controller sensors 224, and the proximity data is of the user's fingers relative to selectable options 220 on the user controller 204. In addition to using the biometric sensing data and the past selectable options, the prediction module 102A, 102B can use the proximity data of a selectable option 220 to predict that the selectable option 220 is being targeted by the user. The proximity data can be weighted during the prediction by the prediction module 102A, 102B.

The computer system 206 includes processors 270, memory 272, and computer-executable instructions which execute on the processors 270. The computer-executable instructions are coupled to the memory 272 and function as discussed herein. The computer system 206 can include transmitters and receivers to transmit and receive data. In some implementations, the computer system 206 can include the prediction module 102B which operates as discussed herein. The prediction module 102B can receive biometric sensing data directly from the biometric sensors 202 of biometric device 208. Using the biometric sensing data, the prediction module 102B can predict and execute commands (or control signals which cause execution of commands) for targeted selectable options 220 prior to the user actually selecting any one of the selectable options 220. In some examples, functions of the user controller 204 and computer system 206 may be integrated as a single computer system. In some examples, functions of the user controller 204 and computer system 206 can be separate units in connection.

The prediction module 102A, 102B predicts user selection of targeted selectable options 220 on the user controller 204, and the targeted selectable options 220 each have a command/control signal associated therewith on the user controller 204. The prediction module 102A, 102B and/or command application program 222 can preemptively issue and send the predicted command (or control signal) for the targeted selectable option 220 to the computer system 206, and the computer system 206 executes the command (or control signal) prior to the user actually selecting the targeted selectable options 220. The command application program 222 can replicate the commands and/or control signals associated with the selectable options 220 such that the preemptive commands/control signals are sent in advance of the user physically selecting the selectable options 220. The preemptive command (or control signal) can cause an application program 240 on the computer system 206 to change state based on the prediction by the prediction module 102A, 102B. In some implementations, the command application program 222 and/or portions of the command application program 222 can be on the computer system 206 which is illustrated as a dashed box. As such, the command application program 222 on computer system 206 can replicate the preemptive command and cause the preemptive command to change the state of the application program 240 on the computer system 206 in cases when the prediction module 102A or the prediction module 102B predicts the selectable option 220 to be selected. In some implementations, the prediction module 102B on the computer system 206 receives the biometric sensor data directly from the biometric device 208, and the prediction module 102B can issue the preemptive command.

The application program 240 on the computer system 206 can be for various purposes. As one example, the application program 240 can be a gaming application program. The application program 240 can be rendered on a display device coupled to the computer system 206. The computer system 206 can be practiced in distributed cloud computing environments where tasks (such as application program 240) are performed by remote processing devices that are linked through a communications network. In a distributed cloud computing environment, part of the application program 240 may be located in both local and remote computer system storage media including memory storage devices. Whether local, distributed, and/or partly local and partly remote, the application program 240 can utilize preemptive execution of the selectable options 220 via the prediction module 102A, 102B and biometric sensors 202 which can lead to a performance increase in time sensitive tasks, such as online multiplayer games, single person games, time sensitive purchases, etc. For example, personal computer gamers can gain through increased key press speed (i.e., increased selectable option speed), thereby providing a competitive edge. The computer system 206 could be representative of various communication devices, including smartphones or cellphones, laptops, personal computers, hand held devices, smart home devices, gaming systems, etc.

Figures 3A, 3B:
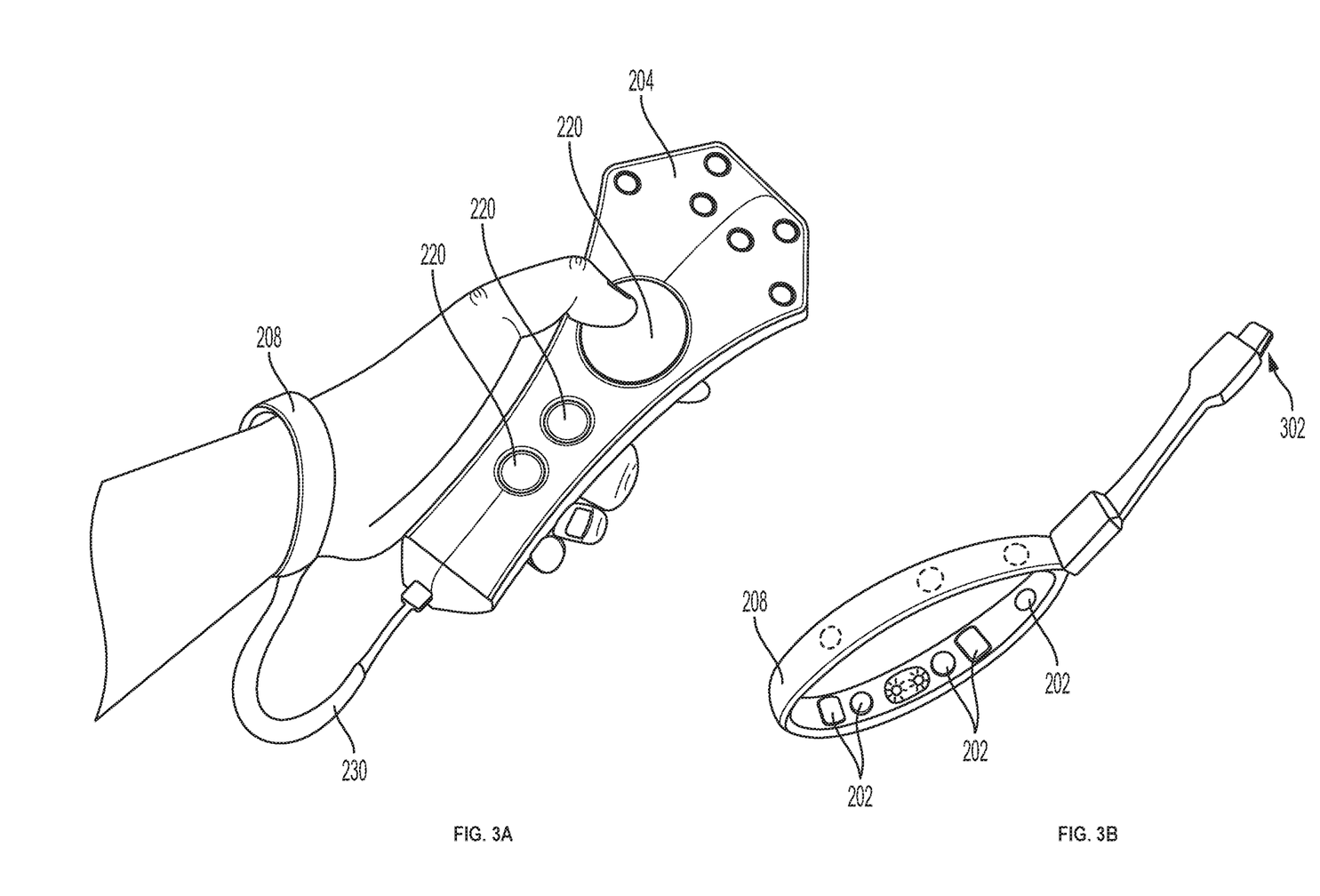
FIG. 3A depicts an example user controller with integrated biometric sensors.
FIG. 3B depicts an example biometric device.

There can be various implementations of the user controller 204 and the biometric device 208. As one example scenario, FIG. 3A illustrates an example user controller strap with integrated biometric sensors. In FIG. 3A, the user controller 204 can be a game controller or other input device. The user controller 204 can have various selectable options 220 on the front, back, side, etc, which are accessible by the user while holding the user controller 204 in the user's hand. The biometric device 208 is illustrated as a wrist strap or biometric sensing bracelet. The biometric device 208 can be operatively connected to the user controller 204 via connection 230. Although a wired connection is shown in FIG. 3A, the connection 230 could be a wireless connection. The biometric device 208 can have numerous biometric sensors 202 on an inner surface of the biometric device 208 to be pressed against the user's arm or wrist, depicted in FIG. 3B. FIG. 3B illustrates an example of the biometric device 208 disconnected from the user controller 204. The biometric device 208 can have a connector 302 for coupling to the user controller 204. In FIGS. 3A and 3B, the prediction module 102A in user controller 204 receives the user's biometric sensing data from biometric device 208 of the user targeting selectable options 220 and predicts the targeted selectable options 220 from the biometric sensing data before the user presses any of the targeted selectable options 220 (e.g., before pressing the buttons on the user controllers). The prediction module 102A and/or command application program 222 can send a preemptive command signal corresponding to each one of the targeted selectable options 220 to the computer system 206, prior to the user selecting any one of the targeted selectable options 220.

Figure 4A:
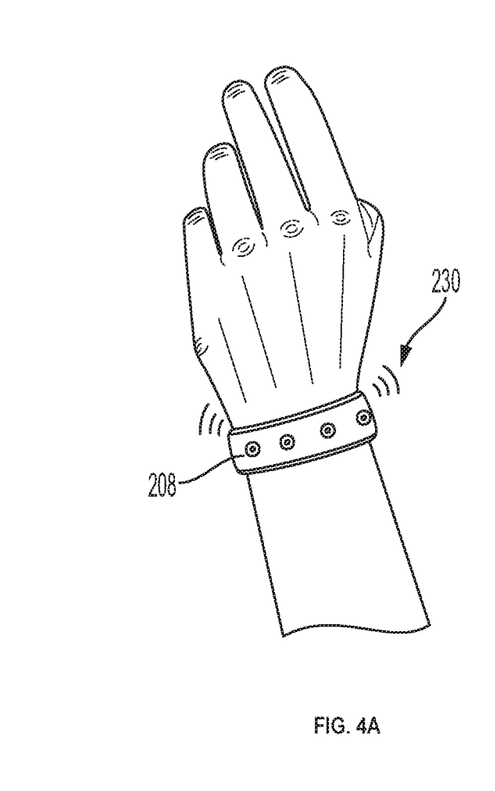
FIG. 4A depicts an example biometric device with a wireless connection.
Figure 4B:
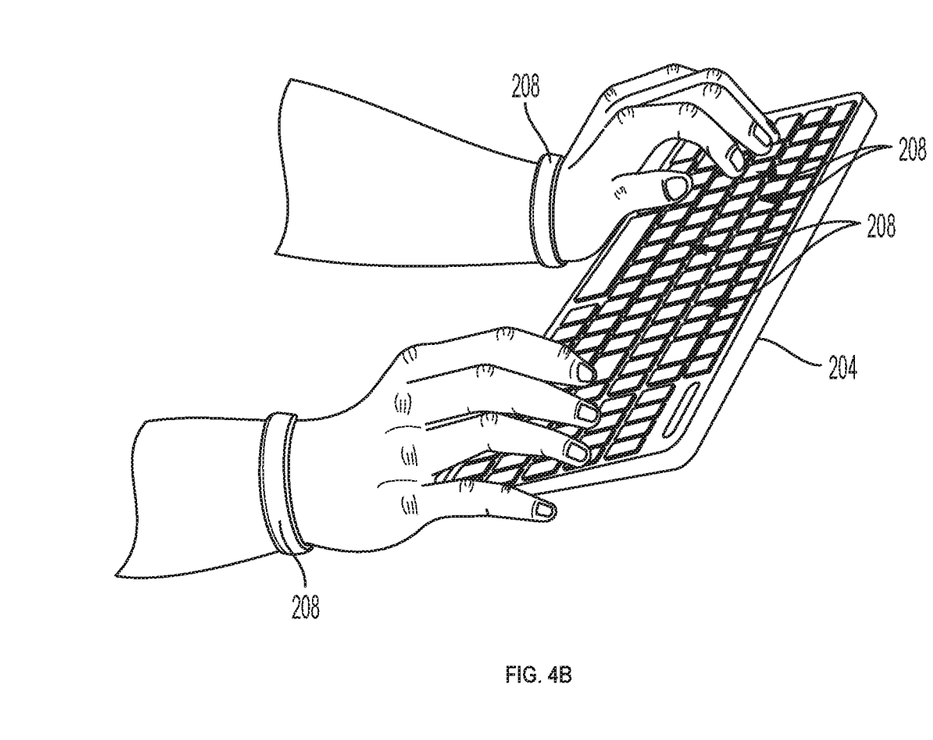
FIG. 4B depicts an example biometric device operatively coupled to an example user controller.

As an example scenario, FIG. 4A illustrates an example biometric device 208 with a wireless connection as the connection 230 to the user controller 204. The biometric device 208 is illustrated as a wrist strap or biometric sensing bracelet. The biometric device 208 can have various biometric sensors 202 around the inner circumference as noted above. FIG. 4B illustrates an example of the user controller 204 operatively coupled to biometric device 208. There can be one, two, three, etc., biometric devices 208 used by a user. In this example, the user is shown with two biometric devices 208 with one biometric device 208 on each arm, wrist, and/or forearm to extract biometric sensing data (e.g., EMG signals). In cases where more than one biometric device 208 is utilized, the prediction module 102A, 102B can register or know in advance the number of biometric devices 208, and each biometric device's location on the body of the user, and the type of user controller 204 being used (e.g., a keyboard in FIG. 4B). As such, the prediction module 102A, 102B knows which type of biometric sensing data to expect, the arrangement of the selectable options 220 on the user controller 204, and the approximate location of the user's hand or fingers on the user controller 204 (e.g., the keyboard). In FIG. 4B, the keyboard has various selectable options 220 which can be keys on the keyboard. The biometric device 208 can be operatively connected to the user controller 204 via the wireless connection as connected 203 but a wired connection could be used. In FIG. 4B, the prediction module 102A in user controller 204 receives the user's biometric sensing data from biometric devices 208 of the user targeting selectable options 220 (i.e., keys on the keyboard) and predicts the targeted selectable options 220 from the biometric sensing data before the user presses any of the targeted selectable options 220 (e.g., before pressing the keys on the keyboard). The prediction module 102A and/or command application program 222 can send a preemptive command signal corresponding to each one of the targeted selectable options 220 to the computer system 206, prior to the user selecting any one of the targeted selectable options 220.

The various components, modules, engines, devices, etc. described regarding FIGS. 1, 2, 3A, 3B, 4A, and 4B can be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein can be a combination of hardware and programming. The programming can be processor executable instructions stored on a tangible memory, and the hardware can include processing circuitry for executing those instructions. Thus, a system memory can store program instructions that when executed by processing circuitry implement the engines described herein. Other engines can also be utilized to include other features and functionality described in other examples herein. In some examples, the modules, engines, device, etc., can include dedicated hardware, such as integrated circuits, application specific integrated circuits (ASICs), application specific special processors (ASSPs), field programmable gate arrays (FPGAs), or any combination of the foregoing examples of dedicated hardware, for performing the techniques described herein.

Figure 5:
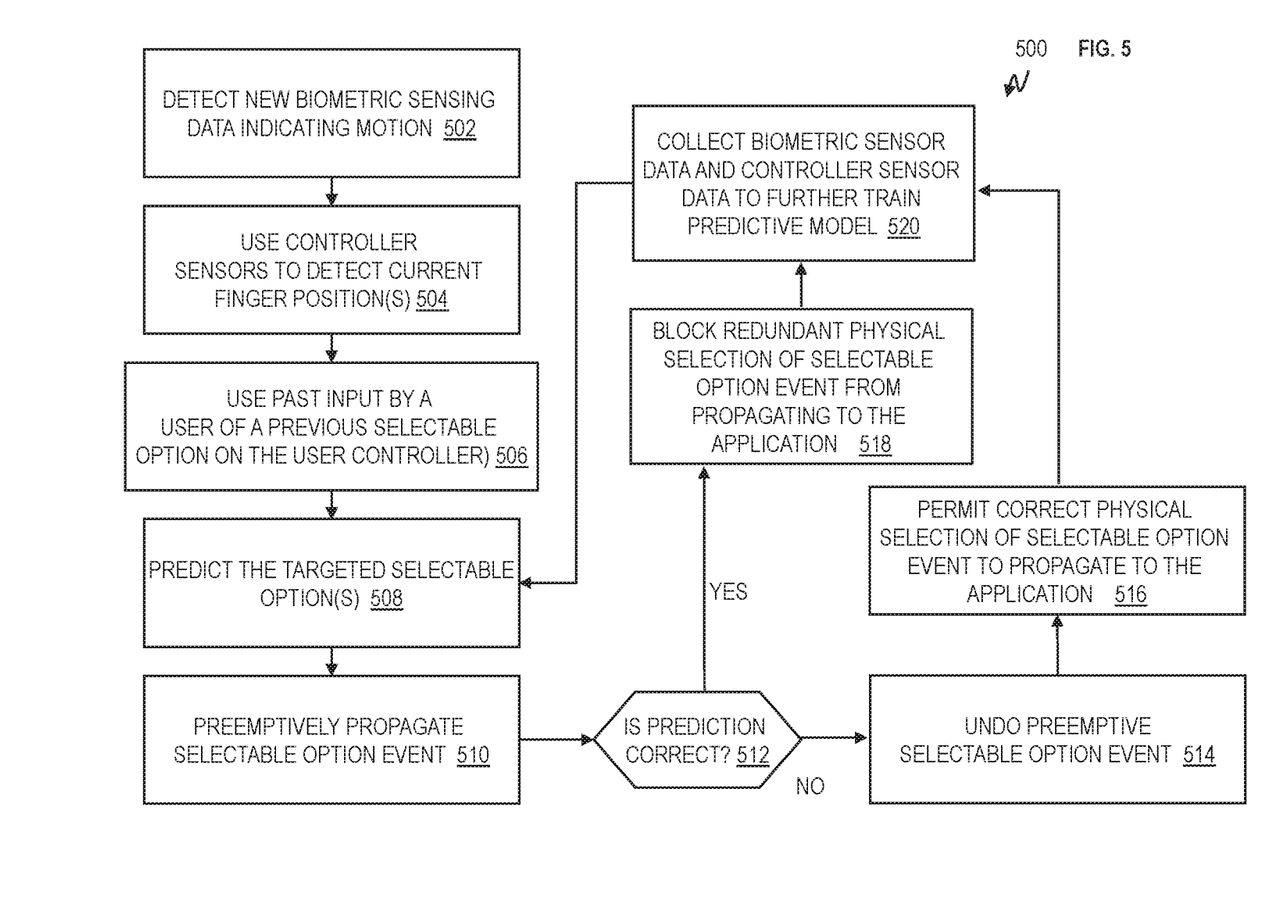
FIG. 5 depicts an example flowchart for using biometric sensing data to preemptively propagate a selection of a selectable.

Turning to FIG. 5, a flowchart 500 is depicted for using biometric sensing data to preemptively propagate a prediction selection (e.g., button press) of a targeted selectable option prior to the user actually pressing a button. At block 502, the predication module 102A, 102B can detect new biometric sensor data (e.g., EMG signals) indicating motion (such as, e.g., finger motion related to muscles of the user) from the biometric device 208. At block 504, the prediction module 102A, 102B may use controller sensors 224 on the user controller 204 to detect current finger position. The prediction module 102A, 102B can receive proximity data from the controller sensors 224 of the user's position of the fingers relative to selectable options 220 on the user controller 204.

At block 506, the prediction module 102A, 102B may receive feedback of the user's prior input of a past selectable option from feedback module 124. In some implementations, the feedback module 124 can be separate from the prediction module 102A, 102B. The feedback module 124 can be in the user controller 204 and/or the computer system 206, such that the feedback module 124 relays the user's prior input of a previous selectable option 220 immediately made by the user back to the prediction module 102A, 102B.

At block 508, the prediction module 102A, 102B can use the predictive model or model module 110 (e.g., machine learning model, statistical model, etc.) to predict the targeted selectable option 220 (e.g., targeted physical button) on the user controller 204 according to the biometric sensing data and using the user's prior input of the past selectable option (e.g., previous key pressed) and further using proximity data (e.g., current finger position(s)) of controller sensors 224 on the user controller 204.

At block 510, the prediction module can preemptively propagate a button press event to the computer system 206, cause the user controller 204 to preemptively propagate the button press event to the computer system 206, and/or cause the command application program 222 to preemptively propagate the button press event to the computer system 206. For example, the prediction module issues the preemptive command/control signal and/or the prediction module causes the user controller 204/command application program 222 to issue the preemptive command/control signal, prior to the user actually pressing the key.

At block 512, the prediction module 102A, 102B and/or the command application program 222 can check if the prediction of the targeted button press is correct. For example, the user presses a button, i.e., selects a selectable option, and the prediction module 102A, 102B and/or the command application program 222 checks whether the actual button pressed by the user is the same as the predicted button, i.e., the predicted selectable option.

At block 514, when the prediction module 102A, 102B and/or the command application program 222 determines that the prediction is incorrect, e.g., No, the prediction module 102A, 102B and/or the command application program 222 may undo the preemptive button press. The prediction module 102A, 102B and/or the command application program 222 allow the correct physical selection of the selectable option event, for example, physical button press event, to propagate to the application program 240 on the computer system 206, at block 516.

At block 518, when the prediction module 102A, 102B and/or the command application program 222 determines that the prediction is correct, e.g., Yes, the prediction module 102A, 102B and/or the command application program 222 can block the redundant physical selection of the selectable option event, for example, redundant physical button press event, from propagating to the application program 240. For example, the prediction module 102A, 102B predicts that a selectable option 220 will be selected and causes the preemptive command/control signal for the predicted selectable option 220, prior to user selection. When the user actually selects the same selectable option 220 as predicted, the prediction module 102A, 102B and/or the command application program 222 blocks the redundant command/control signal from being transmitted to and/or executed by the computer system 206. At block 520, the prediction module 102A collects biometric sensor data from biometric device 208 and controller sensor data from controller sensors 224 to further train the predictive model module 110.

Figure 6:
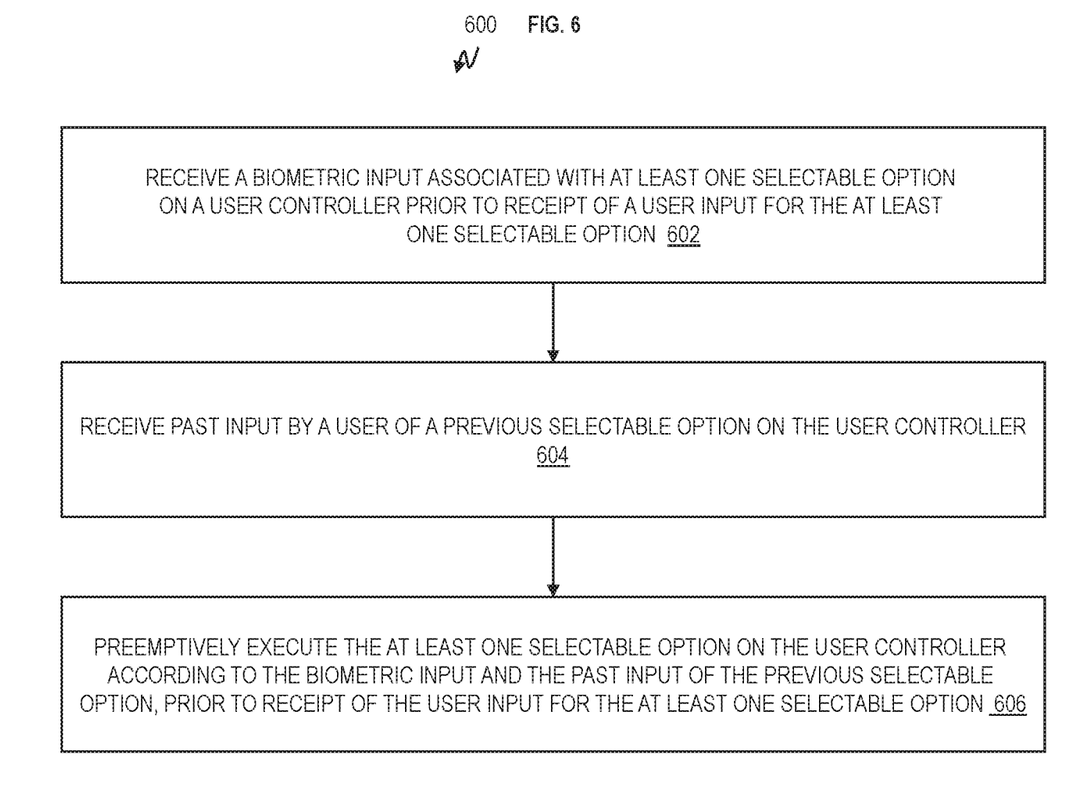
FIG. 6 depicts an example flowchart of a computer-implemented method.

FIG. 6 depicts an example flowchart 600 of a computer-implemented method for preemptive execution. At block 602, the prediction module 102A, 102B can receive a biometric input, for example, biometric sensor data, associated with at least one selectable option 220 on a user controller 204 prior to receipt of a user selection for the at least one selectable option 220. The prediction module 102A, 102B can receive biometric sensing data from the biometric device 208. At block 604, the prediction module 102A, 102B may receive past input by a user of a previous selectable option on the user controller 204. For example, the prediction module 102A, 102B can receive and use the past input by the user of a previous selection, for example, key or button press, of the previous selectable option from a feedback module 124. The prediction module 102A, 102B can retrieve the past input or identification of the past input of the previous selectable option from memory 262 and/or memory 272. At block 606, the prediction module 102A, 102B can preemptively execute and/or cause the preemptive execution of the at least one selectable option 220 on the user controller 204 according to the biometric input and the past input of the previous selectable option 220, prior to receipt of the user selection for the at least one selectable option.

The prediction module 102A, 102B and/or command application program 222 can cause a preemptive command corresponding to the at least one selectable option 220 to be performed in response to preemptively executing the at least one selectable option 220 on the user controller 204 according to the biometric input and the past input of the previous selectable option 220. The preemptive command is performed and/or sent to be performed prior to the user physically selecting the at least one selectable option 220.

The past input by the user of the previous selectable option 220 on the user controller 204 comprises location information of the previous selectable option 220 on the user controller 204. The user controller 204 has a predefined arrangement of selectable options 220 which are located/positioned such that the user can engage the selectable options 220, such as by pressing a key/button, toggling a toggle, etc. The location information provides the location of the previous selectable option 220 relative to other selectable options 220. Further, the location information of the previous selectable option on the user controller 204 defines a last position of a finger of the user selecting the previous selectable option 220. The location information of the previous selectable option, for example, previous key/button pressed, previous toggle moved (or direction of movement), etc., can be in an x, y, z grid axes. The prediction module 102A, 1028 may utilize the last position, for example, x, y, z position, of the finger of the user selecting the previous selectable option 220 is utilized with the biometric input to predict the at least one selectable option 220 on the user controller as a future selection by the user. In some implementations, the previous selectable option 220 previously selected by the user can be a different key/button from the at least one selectable option predicted as being targeted by the user. In some implementations, the previous selectable option 220 previously selected by the user can be the same key/button as the at least one selectable option predicted as being targeted by the user.

The biometric input comprises biometric sensing data of the user. The biometric input comprises signals of the user that capture motor cortex and/or muscle activation data (e.g., using EMG and/or other sensing techniques). The biometric input is received from biometric devices 208 worn by the user.

The prediction module 102A, 102B may receive a proximity indication associated with the at least one selectable option 220 on the user controller 204. The prediction module 102A, 102B can received the proximity indication from controller sensors 224. The at least one selectable option 220 on the user controller 204 is preemptively executed according to the biometric input and the past input of the previous selectable option 220 and further according to the proximity indication. The proximity indication comprises a proximity of a finger of the user relative to the at least one selectable option 220 on the user controller 204. The controller sensors 224 can be positioned on and/or near the selectable options 220, as well as the user controller 204, in order to detect when fingers of the user approaches, touches, and/or is near the selectable options 220.

Examples provide techniques for user controllers by using biometric sensors and controller sensors, in combination with physical switches such as the selectable options. The physical switches can be used to train a machine learning process to adapt to a user's individual variations in muscle activation signals (e.g., using EMG). Controller sensors can be placed on the physical switches to detect current finger position (e.g., touching or hovering over a particular key) to more accurately predict the targeted switch. The physical switches provide tactile feedback that make the interaction more intuitive and comfortable. Further, techniques provide the ability to detect prediction errors, and potentially undo the errant command. Additionally, in the case of handheld user controllers, the biometric device as an armband can be integrated directly into the arm straps of the user controller.

Figure 7:
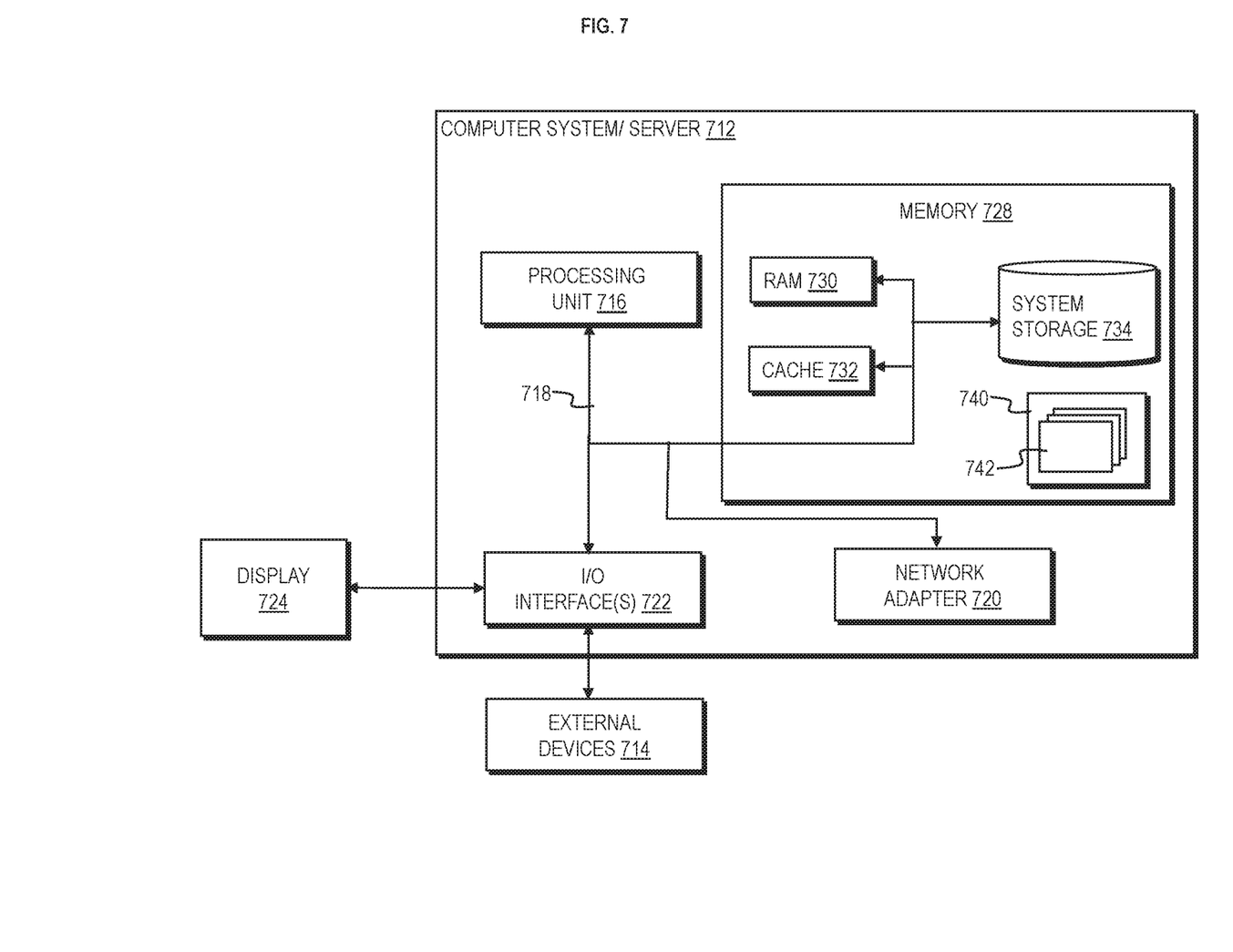
FIG. 7 depicts a schematic of an example computing system having elements and functions which can operate as discussed herein.

FIG. 7 depicts a schematic of an example computing system 712. The computer system/server 712 can be operational with numerous other general purpose or special purpose computing system environments or configurations. The computer system/server 712 can be representative of various types of computer systems on which operations and functions can run as discussed herein. The functions and capabilities of computing system 712 can be utilized in FIGS. 1-6 to implement features of the user controller 204, computer system 206, biometric devices 208, etc.

Examples of computing systems, environments, and/or configurations that can be representative of and/or include elements of computer system/server 712 include, but are not limited to, personal computer systems, phones (e.g., cellphones, smart phones, etc.), server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 712 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 712 may be practiced in distributed cloud computing environments where tasks are performed by remote processing devices that are linked through a communications network. In a distributed cloud computing environment, program modules may be located in both local and remote computer system storage media including memory storage devices.

The components of computer system/server 712 may include, but are not limited to, processors or processing units 716, a system memory 728, and a bus 718 that couples various system components including system memory 728 to processor 716. Bus 718 represents any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 712 can include a variety of computer system readable media. Such media may be any available media that is accessible by computer system/server 712, and it includes both volatile and non-volatile media, removable and non-removable media. The system memory 728 can include computer system readable media in the form of volatile memory, such as random access memory (RAM) 730 and/or cache memory 732. Computer system/server 712 may further include other removable/non-removable, volatile/non-volatile computer system storage media. By way of example, storage system 734 can be provided for reading from and writing to a nonremovable, non-volatile magnetic media. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 718 by data media interfaces. Memory 728 may include at least one program product having a set (e.g., at least one) of program modules that are structured to carry out the functions of examples discussed herein.

Program/utility 740, having a set (at least one) of program modules 742, may be stored in memory 728 by way of example, and not limitation, as well as an operating system, application programs, other program modules, and program data. Each of the operating system, application programs, other program modules, and program data or some combination thereof, may include an implementation of a networking environment. Program modules 742 generally carry out the functions and/or methodologies of examples as described herein.

Computer system/server 712 may also communicate with external devices 714 such as a keyboard, a pointing device, a display 724, etc.; devices that enable a user to interact with computer system/server 712; and/or any devices (e.g., network card, modem, etc.) that enable computer system/server 712 to communicate with other computing devices. Such communication can occur via Input/Output (I/O) interfaces 722. Still yet, computer system/server 712 can communicate with networks such as a local area network (LAN), a general wide area network (WAN), and/or a public network (e.g., the Internet) via network adapter 720. As depicted, network adapter 720 communicates with the other components of computer system/server 712 via bus 718. It should be understood that although not shown, other hardware and/or machine readable components could be used in conjunction with computer system/server 712. Examples, include but are not limited to: microcode, device drivers, redundant processing units, external disk drive arrays, RAID systems, tape drives, and data archival storage systems, etc.

Some examples may be a system, a method, and/or a computer program product at any possible technical detail level of integration. The computer program product may include a computer/machine readable storage medium (or media) having computer/machine readable program instructions thereon for causing a processor to carry out instructions according to examples discussed herein.

The computer/machine readable storage medium can be a tangible device that can retain and store instructions for use by an instruction execution device. The computer/machine readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer/machine readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, and any suitable combination of the foregoing.

Computer/machine readable program instructions described herein can be downloaded to respective computing/processing devices from a computer/machine readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer/machine readable program instructions from the network and forwards the computer/machine readable program instructions for storage in a computer/machine readable storage medium within the respective computing/processing device.

Computer/machine readable program instructions for carrying out operations of examples may be assembler instructions, instruction-set-architecture (ISA) instructions, machine instructions, machine dependent instructions, microcode, state-setting data, configuration data for integrated circuitry, or either source code or object code written in any combination of programming languages, including an object oriented programming language such as Smalltalk, C++, or the like, and procedural programming languages, such as the "C" programming language or similar programming languages. The computer/machine readable program instructions may execute entirely on the user's computer, partly on the user's computer, as a stand-alone machine readable package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer/machine readable program instruction by utilizing state information of the computer/machine readable program instructions to personalize the electronic circuitry, in order to perform examples discussed herein.

The present disclosure is described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer/machine readable program instructions.

These computer/machine readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer/machine readable program instructions may also be stored in a computer/machine readable storage medium that can direct a computer, a programmable data processing apparatus, and/or other devices to function in a particular manner, such that the computer/machine readable storage medium having instructions stored therein comprises an article of manufacture including instructions which implement functions/acts specified in the flowchart and/or block diagram block or blocks.

The computer/machine readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate possible implementations of fabrication and/or operation methods according to various examples. Various functions/operations of the method are represented in the flow diagram by blocks. In some implementations, the functions noted in the blocks can occur out of the order noted in the Figures. For example, two blocks shown in succession can, in fact, be executed substantially concurrently, or the blocks can sometimes be executed in the reverse order, depending upon the functionality involved.

What is claimed is:

1. A method comprising:
   associating a biometric input associated with at least one selectable option on a user controller prior to receipt of a user selection for the at least one selectable option;
   identifying a past input by a user of a previous selectable option on the user controller; and
   preemptively executing the at least one selectable option according to the biometric input and the past input of the previous selectable option, prior to receipt of the user selection for the at least one selectable option.

2. The method of claim 1 comprising causing a preemptive command corresponding to the at least one selectable option to be performed in response to preemptively executing the at least one selectable option according to the biometric input and the past input of the previous selectable option.

3. The method of claim 1, wherein the past input by the user of the previous selectable option on the user controller comprises location information of the previous selectable option on the user controller.

4. The method of claim 1, wherein the past input by the user of the previous selectable option on the user controller comprises location information defining a last position of a finger of the user selecting the previous selectable option.

5. The method of claim 1, wherein the past input by the user of the previous selectable option on the user controller comprises location information defining a last position of a finger of the user selecting the previous selectable option, the last position being utilized with the biometric input to predict the at least one selectable option on the user controller as a future selection by the user.

6. The method of claim 1, wherein the biometric input comprises biometric sensing data of the user.

7. The method of claim 1, wherein the biometric input comprises muscle activation signals of the user.

8. The method of claim 1, wherein the biometric input is received from a biometric device worn by the user.

9. The method of claim 1 comprising receiving a proximity indication associated with the at least one selectable option on the user controller;
   wherein the at least one selectable option on the user controller is preemptively executed according to the biometric input and the past input of the previous selectable option and according to the proximity indication; and
   wherein the proximity indication comprises a proximity of a finger of the user relative to the at least one selectable option on the user controller.

10. The method of claim 1, further comprising correcting the predicted selection of the at least one user selectable option when an actual selection does not match the prediction.

11. The method of claim 1, wherein associating the biometric input associated with the at least one selectable option is weighted based on an elapsed time of past input by the user of the at least one selectable option.

12. A system comprising:
a processor;
a memory coupled to the processor; and
computer-executable instructions to cooperate with the memory and the processor to:
associate a biometric input with at least one selectable option on a user controller prior to receipt of a user selection for the at least one selectable option;
identify a past input by a user of a previous selectable option on the user controller, the previous selectable option having previously occurred;
predict user selection of the at least one selectable option based on received biometric input;
preemptively execute the at least one selectable option associated with the predicted user selection according to the biometric input and the weight of the past input of the previous selectable option, prior to receipt of the user selection for the at least one selectable option;
responsive to an actual user selection not matching the predicted user selection, undoing the preemptive execution of the at least one selectable option.

13. The system of claim 12, wherein the computer-executable instructions to cooperate with the memory and the processor to cause a preemptive command corresponding to the at least one selectable option to be performed in response to preemptively executing the at least one selectable option according to the biometric input and the past input of the previous selectable option.

14. The system of claim 12, wherein:
the past input by the user of the previous selectable option on the user controller comprises location information of the previous selectable option on the user controller, the location information defining a last position of a finger of the user selecting the previous selectable option; and
the last position of the finger is utilized with the biometric input to predict the at least one selectable option on the user controller as a future selection by the user.

15. The system of claim 12, wherein the biometric input comprises muscle activation signals of the user, the biometric input being received from a biometric device worn by the user.

16. The system of claim 12, wherein:
the at least one selectable option on the user controller is preemptively executed according to the biometric input and the past input of the previous selectable option and according to a proximity indication associated with the at least one selectable option on the user controller; and
the proximity indication comprises a proximity of a finger of the user relative to the at least one selectable option on the user controller.

17. The system of claim 12, further comprising a number of sensors disposed against a wrist of the user to receive the biometric input.

18. The system of claim 17, further comprising a control strap to house the number of sensors.

19. The system of claim 12, further comprising a proximity sensor disposed on the at least one user selectable option to detect a user finger position relative to the at least one selectable option.

20. A non-transitory machine-readable storage medium encoded with instructions executable by a processor, the machine-readable storage medium comprising:
instructions to determine a biometric input associated with at least one selectable option on a user controller prior to receipt of a user selection for the at least one selectable option, the biometric input being associated with a user;
instructions to identify a past input by the user of a previous selectable option on the user controller;
instructions to predict the user selection for the at least one selectable option based on received biometric input;
instructions to preemptively execute the at least one selectable option associated with the predicted user selection according to the biometric input and the past input of the previous selectable option, prior to receipt of the user selection for the at least one selectable option;
responsive to an actual user selection not matching the predicted user selection, undoing the preemptive execution of the at least one selectable option; and
responsive to the actual user selection matching the predicted user selection, blocking a redundant execution of the at least one selectable option associated with the actual user selection.

* * * * *